(12) United States Patent  (10) Patent No.: US 9,004,136 B2
Dittmer et al.  (45) Date of Patent: Apr. 14, 2015

(54) CENTER-FOLDED FILM SPLICER

(75) Inventors: Howard R. Dittmer, Lake Bluff, IL (US); Stephen R. Archer, Gilberts, IL (US)

(73) Assignee: Arpac, LLC., Schiller Park, IL (US)

( * ) Notice: Subject to any disclaimer, the term of this patent is extended or adjusted under 35 U.S.C. 154(b) by 667 days.

(21) Appl. No.: 13/292,727

(22) Filed: Nov. 9, 2011

(65) Prior Publication Data

US 2012/0118470 A1  May 17, 2012

Related U.S. Application Data

(60) Provisional application No. 61/413,566, filed on Nov. 15, 2010.

(51) Int. Cl.
*B29C 65/00* (2006.01)
*B65H 21/00* (2006.01)
*B29C 65/18* (2006.01)
*B29C 65/22* (2006.01)

(52) U.S. Cl.
CPC .............. *B65H 21/00* (2013.01); *B29C 66/855* (2013.01); *B65H 2701/11234* (2013.01); *B29C 65/18* (2013.01); *B29C 65/223* (2013.01); *B29C 66/0042* (2013.01); *B29C 66/1122* (2013.01); *B29C 66/43* (2013.01); *B29C 66/8122* (2013.01); *B29C 66/81457* (2013.01); *B29C 66/8227* (2013.01); *B29C 66/8324* (2013.01); *B29C 66/83241* (2013.01); *B29C 66/853* (2013.01); *B29C 66/872* (2013.01)

(58) Field of Classification Search
CPC .............................. B29C 66/855; B65H 21/00
USPC ........ 156/502, 503, 583.1, 583.8, 583.9, 157, 156/289, 293, 308.2, 308.4, 158; 100/200, 100/202, 208; 425/338; 53/451, 203, 450
See application file for complete search history.

(56) References Cited

U.S. PATENT DOCUMENTS

| | | | |
|---|---|---|---|
| 2,586,474 A * | 2/1952 | Moore | 100/200 |
| 3,868,204 A * | 2/1975 | Bongers | 425/338 |
| 4,744,845 A | 5/1988 | Posey | |
| 5,252,171 A * | 10/1993 | Anderson et al. | 156/358 |
| 5,318,646 A | 6/1994 | Cardini et al. | |
| 5,514,237 A | 5/1996 | Emenaker et al. | |
| 5,618,377 A | 4/1997 | Kaneko et al. | |
| 5,669,998 A | 9/1997 | Ward et al. | |

* cited by examiner

*Primary Examiner* — John Goff

(74) *Attorney, Agent, or Firm* — Levenfeld Pearlstein, LLC

(57) ABSTRACT

A center-folded film splicer is disclosed. The splicer comprises a splicer assembly that is adjustably mounted to a wrapping device such that it can be moved between a storage position and an operating (or splicing) position. The splicer assembly comprises a pair of heat bars, an upper heat bar and a lower heat bar, connected with a synchronized hinge and a back-up pad bar disposed therebetween. In this manner, the upper and lower layers (or "legs") of the films from a depleted film roll and a fresh film roll can be simultaneously sealed to each other to create a continuous film that does not need to be rethreaded through the wrapping device when replacing film rolls.

9 Claims, 3 Drawing Sheets

CENTER-FOLDED FILM SPLICER

CROSS-REFERENCE TO RELATED APPLICATIONS

The present application claims the benefit of U.S. Provisional Application 61/413,566, tiled "CENTER-FOLDED FILM SPLICER," filed on Nov. 15, 2010, the entire contents of which are incorporated herein by reference.

BACKGROUND OF THE INVENTION

The present invention relates generally to packaging equipment, and more particularly to a film splicer. Specifically, the film splicer of the instant invention is particularly useful for splicing (or joining) the ends of successive rolls of center-folded films of the type typically used for heat shrink film wrapping devices, such as side-seal heat shrink film wrapping devices.

Wrapping devices and side-seal heat shrink film wrapping devices, in particular, are well known in the art. Such wrapping devices may be used to wrap a variety of products, such as magazines, pads of paper, light bulbs, video tapes, CD-ROMs and pharmaceutical products.

Side-seal heat shrink film wrapping devices operate using films, which may be made of polyolefin, polyvinyl chloride (PVC), polyethylene or other materials as are known in the art. In many heat shrink film wrapping applications, such films are center-folded, meaning that the film is folded in half along its width to create a folded film that has upper and lower layers (or "legs") of approximately equal width connected at the fold.

Such center-folded films generally are wounded and stored on rolls in their folded state. The films are fed into wrapping devices and opened (or unfolded) sufficiently to permit the product to be wrapped to be disposed between the upper and lower legs of the film. In this manner, the fold between the upper and lower legs of the film acts to seal one side of the product, while the wrapping device seals the remaining three sides of the product, typically through the use of an elongated heating element (or combination of heating elements) that engages the unsealed sides of the film and seals the film onto itself. The wrapped product is then passed through a shrink tunnel where the film is heated to a sufficient temperature for a sufficient time so as to shrink the film around the product in a desirable manner.

In prior art heat shrink film wrapping devices, when the center-folded film roll being fed into the wrapping device is depleted (that is, when all of the film stored on the roll has been used), operation of the wrapping device (and the entire packaging line) must be suspended while a new roll of film is mounted and the new film is fed (or threaded) through the wrapping device. At this point, operation of the wrapping device (and the packaging line) may be resumed.

The downtime associated with reloading film rolls into wrapping devices can be significant, and much of this time can be attributed to the time spent feeding (or threading) the film from the new roll of film into the wrapping device. This time decreases the efficiency and speed of the overall packaging process and increases costs. What is needed, therefore, is to reduce the downtime associated with changing film rolls by eliminating the need to thread the film of the new film roll through the wrapping device.

Specifically, there is a need for a film splicer that is specifically adapted to operate with side-seal heat shrink film wrapping devices that use center-folded films. Desirably, such a center-folded film splicer is configured to splice (or join or seal) the ends of center-folded films on successive film rolls such that the trailing end of the film from a depleted film roll is spliced (or joined or sealed) to the leading end of the film of a fresh film roll so that the film from the fresh roll is automatically threaded through the wrapping device.

More desirably, such a center-folded film splicer is configured to simultaneously splice (or join or seal) both the upper and lower legs of a center-folded film. More desirably still, such a center-folded film splicer comprises a splicing assembly that is advantageously and conveniently slidably mounted on the side-seal heat shrink film wrapping device such that it may be moved into and out of an operating (or splicing) position as needed so as not to interfere with the path of the film during operation of the wrapping device. The present invention satisfies these needs.

BRIEF SUMMARY OF THE INVENTION

The present invention comprises a center-folded film splicer particularly suitable for use with side-seal heat shrink film wrapping devices that use center-folded films wound and stored on rolls.

The center-folded film splicer of the present invention is configured to splice (or join or seal) the ends of center-folded films on successive film rolls such that both legs of the trailing end of the film from a depleted film roll are simultaneously spliced (or joined or sealed) to the corresponding legs of the leading end of the film from a fresh film roll. In this manner, the film from the fresh roll is automatically threaded through the wrapping device. This advantageously results in significant reductions in wrapping device and packaging line downtime because the new film does not need to be rethreaded through the wrapping device.

The center-folded film splicer of the present invention is mounted on or near a wrapping device, such as a side-seal heat shrink film wrapper, preferably in close proximity to the roll of center-folded film being fed into the wrapping device. In the preferred embodiment of the present invention, the center-folded film splicer is mounted to the wrapping device and comprises a moveable splicer assembly that may be stored in a position that is out of the path of the film when the wrapping device is in use, but moved into an operating (or splicing) position that is in the path of the film when a new film roll is loaded. The splicer assembly preferably is slidably mounted to the wrapping device using a slide roller carriage slidably mounted to a slide rail (or track) attached to the wrapping device.

The center-folded film splicer of the present invention also comprises a pair of heat bars, an upper heat bar and a lower heat bar. The upper and lower heat bars preferably each have wires disposed therein that can be energized to generate heat to melt the upper and lower layers (or "legs") of the center-folded film in order to create a seal. The upper and lower heat bars preferably are connected with a synchronized hinge such that the upper and lower heat bars pivot in unison with each other (that is, when the upper heat bar is moved downward, the lower heat bar moves upward, and vice versa). Preferably, the heat bars are spring-loaded (or otherwise biased) in an open position.

The center-folded film splicer preferably further comprises a back-up pad bar. The back-up pad bar is disposed between the upper heat bar and the lower heat bar and extends generally horizontally from between the synchronized hinge. The back-up pad bar preferably comprises a metal bar having foam pad strips attached to its upper and lower sides. The foam pad strips preferably are covered by a non-stick surface, such as polytetrafluoroethylene tape.

The back-up pad bar is configured such that the upper leg of the trailing end of the film from a depleted film roll and the upper leg of the leading end of the film of a fresh film roll are disposed between the back-up pad bar and the upper heat bar, while the lower leg of the trailing end of the film from a depleted film roll and the lower leg of the leading end of the film of a fresh film roll are disposed between the back-up pad bar and the lower heat bar. In this manner, the upper and lower legs of the films from the depleted film roll and the fresh film roll can be simultaneously sealed to each other to create a continuous film that does not need to be rethreaded through the wrapping device.

Preferably, the center-folded film splicer of the present invention further comprises an electronic control system that controls the flow of electricity to the wires disposed in the upper and lower heat bars. The electronic control system comprises a position switch disposed on the upper heat bar as well as a pushbutton switch disposed in a different location, such as on the wrapping device.

The control system is configured such that electricity can flow to the wires, thereby heating the upper and lower heat bars, only when both the position switch is closed (when the upper and lower heat bars are in a fully closed position) and the pushbutton switch is depressed. Preferably, the control system also is configured to automatically limit the dwell time for energizing the wires so that the splice created between the film layers is of a consistently good quality.

These and other features and advantages of the present invention will be apparent from the following detailed description, in conjunction with the appended claims.

BRIEF DESCRIPTION OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
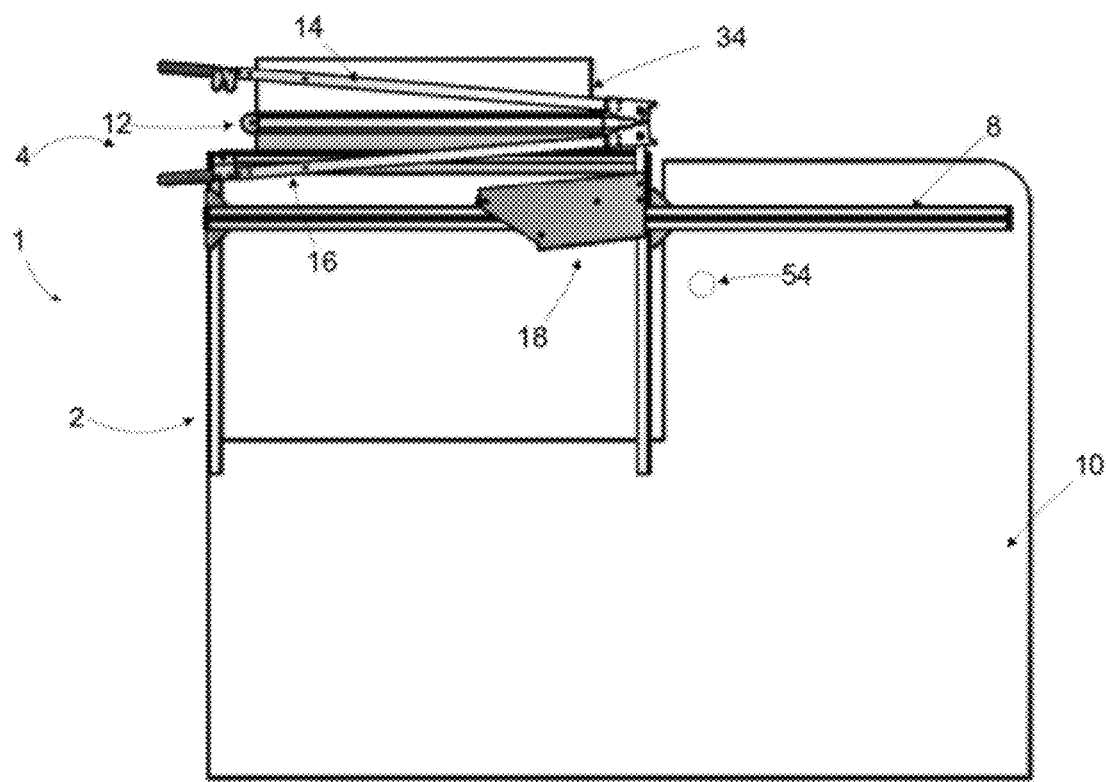
FIG. 1 depicts a front view of a center-folded film splicer embodying the principles of the present invention as attached to a side-seal wrapping device.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description of the Invention," relates to a requirement of the United States Patent Office, and does not imply, nor should be inferred to limit the subject matter disclosed herein.

The center-folded film splicer of the present invention is configured to splice (or join or seal) the ends of center-folded films on successive film rolls such that both legs (upper and lower) of the trailing end of the film from a depleted film roll are simultaneously spliced (or joined or sealed) to the corresponding legs of the leading end of the film from a fresh film roll. In this manner, the film from the fresh roll is automatically threaded through the wrapping device. This advantageously results in significant reductions in wrapping device and packaging line downtime because the new film does not need to be rethreaded through the wrapping device.

It should be noted that the center-folded film splicer of the present invention is particularly suitable for use with side-seal heat shrink film wrapping devices that use center-folded films wound and stored on rolls. However, it will be appreciated that the center-folded film splicer of the present invention can be adapted to be used with other wrapping devices that use center-folded films, and all such adaptations and related embodiments are included within the scope of the present disclosure.

FIG. 1 depicts one embodiment of the center-folded film splicer 1 of the present invention. The center-folded film splicer 1 comprises a support frame 2, a splicing assembly 4, slide roller carriage 18 and a slide rail (or "track") 8. The support frame 2 may be configured to mount to a side of, or otherwise be disposed in proximity to, a wrapping device 10. The support frame 2 may also be detachable from the wrapping device 10. The height of the support frame 2 may be adjustable to allow the height of splicing assembly 4 to accommodate the height requirements of the wrapping device 10.

In some embodiments of the center-folded film splicer 1 of the present invention, the center-folded film splicer 1 may further comprise an integrated film feeder 34 mounted on the center-folded film splicer 1. In other embodiments, the film feeder 34 may be disposed in proximity to the center-folded film splicer 1, such as mounted on wrapping device 10. All such embodiments are included within the scope of the instant disclosure.

Figure 2:
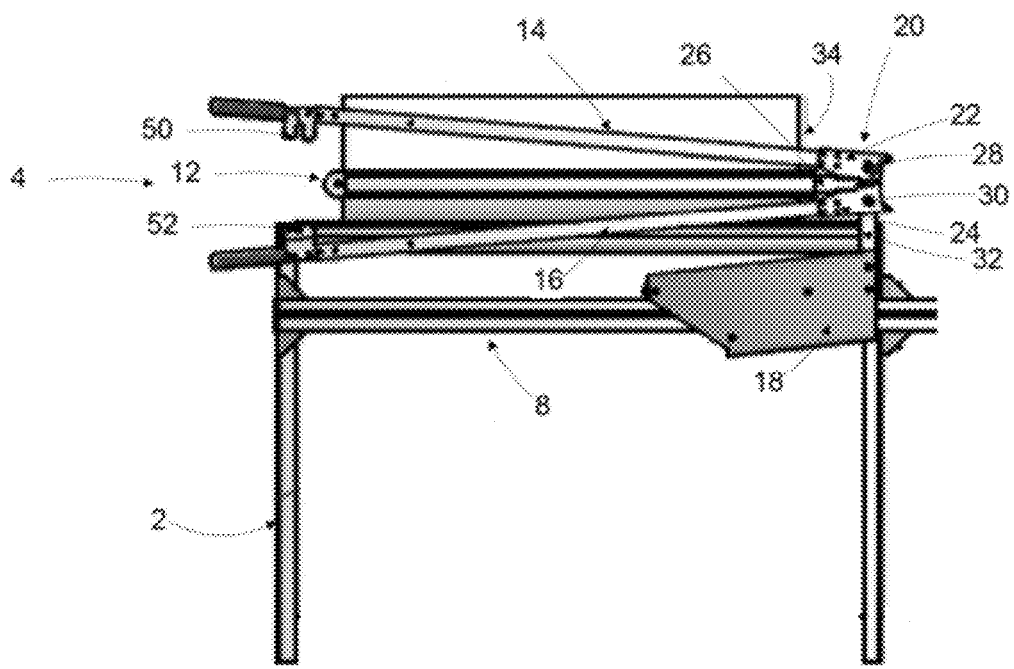
FIG. 2 depicts a front view of a splicing assembly and support frame of the center-folded film splicer of FIG. 1.

FIG. 2 depicts a front view of the splicing assembly 4 and support frame 2. The splicing assembly 4 includes a back-up pad bar (or "contact bar") 12 positioned between an upper heat bar 14 and a lower heat bar 16. The back-up pad bar 12, upper heat bar 14 and lower heat bar 16 are coupled together by a synchronized hinge 20. The synchronized hinge 20 includes an upper sleeve 22, a lower sleeve 24 and a middle sleeve 26. The middle sleeve 26 is substantially horizontal and is sized to accommodate the back-up pad bar 12. The upper sleeve 22 and lower sleeve 24 are angled away from the middle sleeve 26, in opposite directions, and are each sized to accommodate one end of the upper heat bar 14 and lower heat bar 16, respectively.

The synchronized hinge 20 is affixed to the slide roller carriage 18 by connections 28 and 30 and extension bar 32, and is configured such that the upper sleeve 22 and the lower sleeve 24 are pivotally mounted to the synchronized hinge 20. In this manner, the upper heat bar 14, which is affixed to the upper sleeve 22, is moveable such that a force applied in a downward direction (towards the back-up pad bar 12) causes the upper heat bar 14 to move from an open position (out of contact with the back-up pad bar 12) to a closed position (generally parallel to the back-up pad bar 12) with the lower surface of the upper heat bar 14 being in contact with the top surface of the back-up pad bar 12. In this position, the force applied over the entire top surface of the back-up pad bar 12 is substantially uniform.

Similarly, the lower heat bar 16, which is affixed to the lower sleeve 24, is moveable such that a force applied in an upward direction (towards the back-up pad bar 12) causes the lower heat bar 16 to move from an open position (out of contact with the back-up pad bar 12) to a closed position (generally parallel to the back-up pad bar 12) with the upper surface of the lower heat bar 16 being in contact with the bottom surface of the back-up pad bar 12. In this position, the force applied over the entire bottom surface of the back-up pad bar 12 is substantially uniform.

The synchronized hinge 20 is also configured such that the upper heat bar 14 and the lower heat bar 16 pivot in unison (synchronized hinges that operate in this manner generally known in the art). That is, when the upper heat bar 14 is moved in a downward direction (towards the back-up pad bar 12), the lower heat bar 16 correspondingly moves in an upward direction (towards the back-up pad bar 12). The synchronized movement of the upper heat bar 14 and the lower heat bar 16 permits the film sealer to simultaneously splice (or join) the upper and lower legs of the trailing end of the film from a depleted film roll to the corresponding legs of the leading end of the film from a fresh film roll.

Preferably, the synchronized hinge 20 is configured to bias the upper heat bar 14 and the lower heat bar 16 to an open position (that is, a position where the upper heat bar 14 and the lower heat bar 16 are not in contact with the back-up pad bar 12) such that the upper heat bar 14 and the lower heat bar 16 only engage the back-up pad bar 12 (and the film) when intended. Such an open-biased position also aids in the movement of the splicing assembly 4 from the operating (or splicing) position to the storage position, and vice versa. The synchronized hinge 20 preferably bias the upper heat bar 14 and the lower heat bar 16 in an open position using a spring-loaded design, however, those skilled in the art will recognize that other biasing means are possible and all such means are included within the scope of the instant disclosure.

The synchronized hinge 20 is attached to the slide roller carriage 18 by an extension bar 32. The slide roller carriage 18 slidably engages the slide rail 8 such that the splicing assembly 4 may be moved from an operating (or splicing) position where the splicing assembly 4 is disposed in the path of the film, to a storage position (not shown) where the splicing assembly 4 is disposed outside the path of the film. The slide roller carriage 18 may include a locking mechanism to lock the splicing assembly 4 into the operating (or splicing) position or the storage position.

The upper heat bar 14 and the lower heat bar 16 preferably each have wires disposed therein that can be energized to generate heat to melt the upper and lower layers (or "legs") of the center-folded film in order to create a seal. The use of energizable wires within heat bars is generally known in the art, however, those skilled in the art will recognize that there are other means by which the film may heat sealed, and all such means are included within the scope of the instant disclosure.

The back-up pad bar 12 preferably is disposed between the upper heat bar 14 and the lower heat bar 16, and extends generally horizontally from the middle sleeve 26 of the synchronized hinge 20. The back-up pad bar 12 preferably includes a metal bar having foam pad strips attached to its upper and lower sides. The foam pad strips preferably are covered by a non-stick surface, such as polytetrafluoroethylene tape or any other heat resistant, non-stick material as is known in the art. In this manner, the film will not stick to the back-up pad bar 12 during the sealing process.

Figure 3:
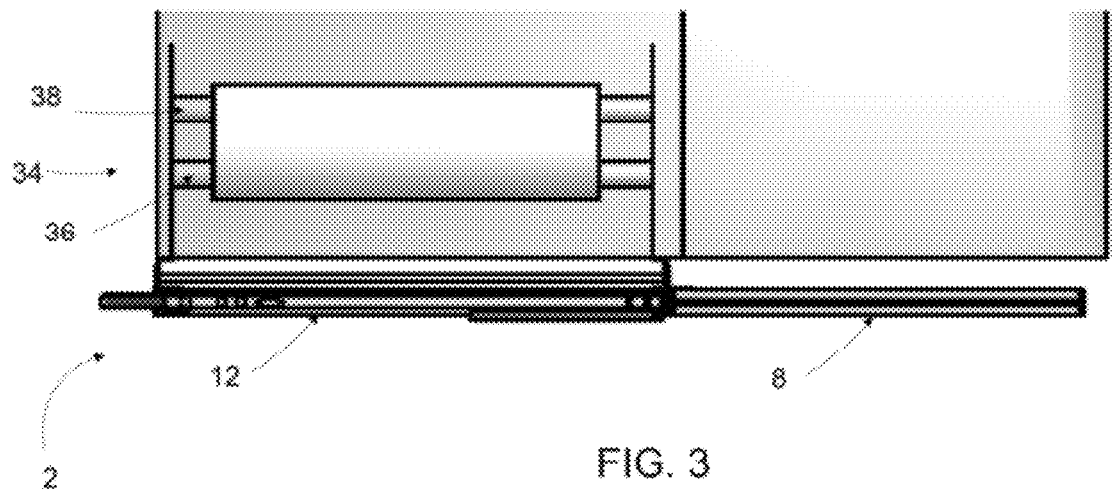
FIG. 3 depicts a top view of the center-folded film splicer of FIG. 1.

FIG. 3 depicts a top view of the center-folded film splicer 1. A full roll of film is positioned on a film feeder 34 that includes two rollers 36 and 38. The roll rotates on the two rollers 36 and 38 and dispenses film into wrapping device 10. The film feeder 34 may also be a spool (not shown) which rotates to dispense film into the wrapping device 10.

As previously described, the film feeder 34 may be integrated with the center-folded film splicer 1, integrated with the wrapping device 10 or separate from the center-folded film splicer 1 and the wrapping device 10. As an illustrative example, the film feeder 34 may be affixed to the wrapping device 10, and configured such that film from the film feeder 34 may be fed into the wrapping device 10, with the center-folded film splicer 1 disposed to engage the film at a location between the film feeder 34 and point at which the film enters the wrapping device 10.

Figure 4:
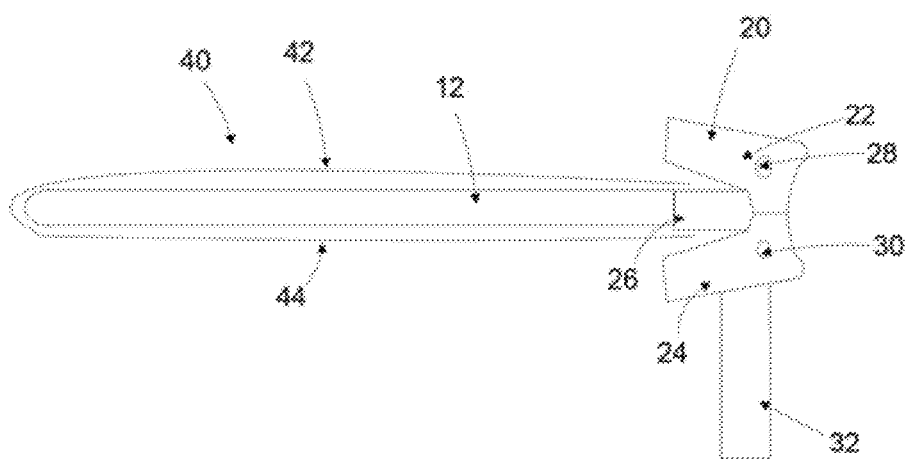
FIG. 4 depicts a front view of a back-up pad bar included in the splicing assembly of FIG. 2 (the upper and lower heat bars of the splicing assembly are not shown)

FIG. 4 depicts one embodiment of the back-up pad bar 12 with a film 40 positioned around the back-up pad bar 12. When the splicer assembly 4 of the present invention is disposed in the operating (or splicing) position, the back-up pad bar 12 preferably is positioned centrally in the path of the film 40 such that an upper leg 42 and a lower leg 44 of the film 40 may pass above and below, respectively, the back-up pad bar 12.

Figure 5:
FIG. 5 depicts a top view of the back-up pad bar of FIG. 4 along with portions of the leading end and trailing end of the films being sealed.

FIG. 5 depicts a top view of the back-up pad bar 12 including the film from the depleted roll 46 (shown in dotted lines) and the film from the new roll 48 positioned on the back-up pad bar 12 for sealing. The upper leg of the trailing end of the film from a depleted film roll 46 and the upper leg of the leading end of the film of a fresh film roll 48 (not shown) are disposed between the back-up pad bar 12 and the upper heat bar 14 (not shown), while the lower leg of the trailing end of the film from a depleted film roll (not shown) and the lower leg of the leading end of the film of the fresh film roll (not shown) are disposed between the back-up pad bar 12 and the lower heat bar 16 (not shown). In this manner, the upper and lower legs of the films from the depleted film roll 46 and the fresh film roll 48 can be simultaneously sealed to each other to create a continuous film that does require rethreading through the wrapping device 10.

An overlap area 50 is created where the trailing end of film from the depleted roll 46 meets the leading end of the film from the new roll 48. The overlap area 50 has a width sufficient to accommodate the heating wires of the upper and lower heat bars 14 and 16 such that substantially the entire heating surface of the upper and lower heat bars 14 and 16 are in contact with either the depleted roll 46 or the film from the new roll 48 depending on how the films are arranged (that is, the film from the depleted roll 46 may be positioned on the back-up pad bar 12 above the film from the new roll 48, or, conversely, the film from the new roll 48 may be positioned on the back-up pad bar 12 above the film from the depleted roll 46).

Figure 6:
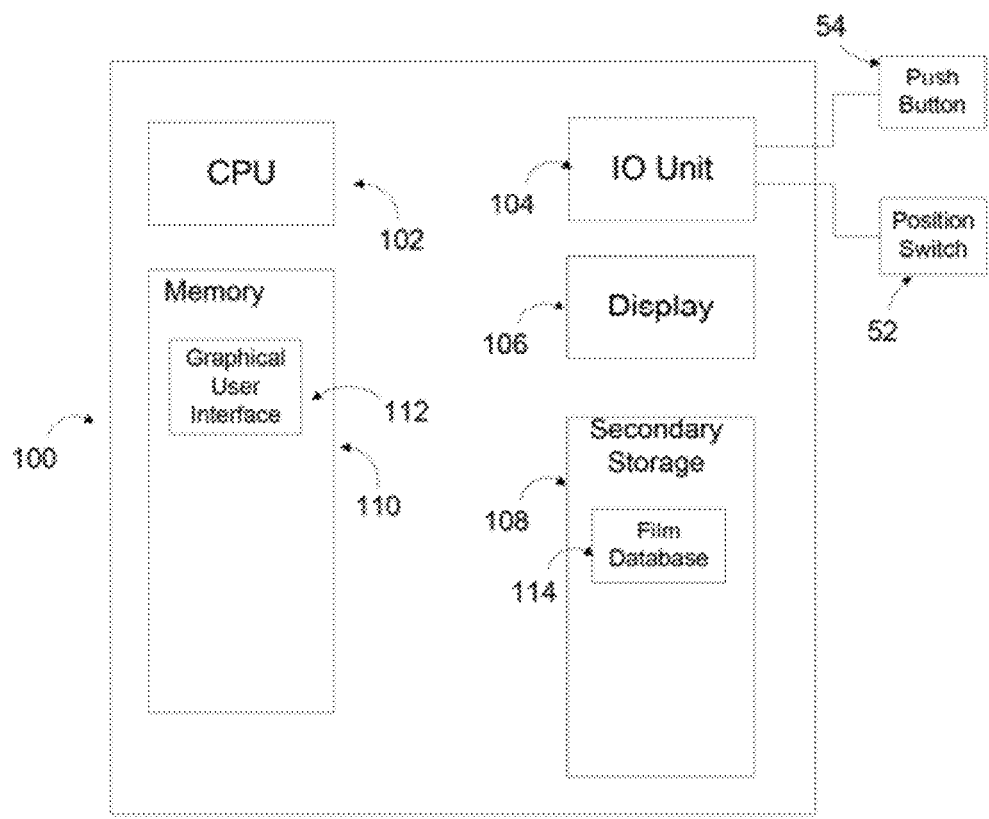
FIG. 6 depicts a control system used to control the operation of the center-folded film splicer of FIG. 1; and, FIG. 7 illustrates an operation performed by the control system in FIG. 6.

FIG. 6 depicts a control system that controls the operation of the center-folded film splicer 1. Control system 100 comprises a central processing unit (CPU) 102, an input output (I/O) unit 104, a display device 106, a secondary storage device 108, and a memory 110. Control system 100 may further comprise standard input devices such as a keyboard, a mouse, a digitizer, or a speech processing means (each not illustrated).

Control system 100's memory 110 includes a graphical user interface (GUI) 112, which is used to gather information from a user via the display device 106 and I/O unit 104 as described herein. The GUI includes any user interface capable of being displayed on a display device 106 including, but not limited to, a web page, a display panel in an executable program, or any other interface capable of being displayed on a computer screen. The secondary storage device 108 includes a film database 114 that stores sealing information pertaining to different types of films that the center-folded film splicer 1 may seal. In some embodiments, the GUI 112 may also be stored in the secondary storage unit 108 without departing from the scope of the present invention.

The control system 100 is configured to control the electricity that flows to the wires in the upper heat bar 14 and the lower heat bar 16, thereby heating the upper heat bar 14 and the lower heat bar 16, only when both a position indication switch (or "position switch") 52 is closed (that is, when the upper heat bar 14 and the lower heat bar 16 are in a fully closed position, generally parallel with the back-up pad bar 12) and a pushbutton switch (or "push button") 54 is depressed. Preferably, the control system 100 is also configured to automatically limit the dwell time for energizing the wires in the upper heat bar 14 and the lower heat bar 16 so that the splice created between the film legs is of a consistently good quality. The dwell time and temperature may be adjustable based on the film material, thickness and other characteristics of the film. The position indication switch 52 preferably is disposed on the upper heat bar 14 and the pushbutton switch 54 is disposed in a different location in proximity to the center-folded film splicer 1, with both the position indication switch 52 and pushbutton switch 54 being electronically coupled to the I/O unit 104.

Figure 7:
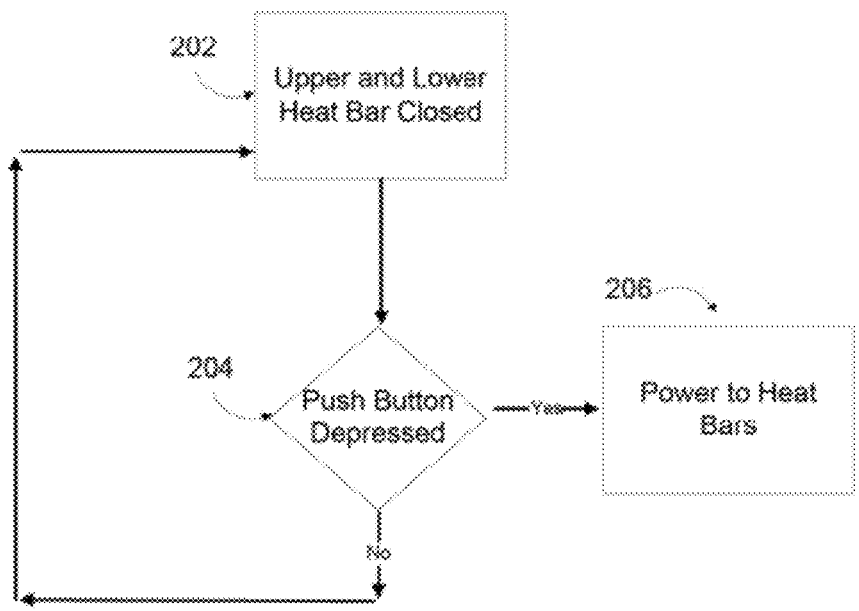

FIG. 7 illustrates an operation performed by the control system in FIG. 6. In step 202, the control system 100 receives a closed signal from the position indication switch 52, indicating that the upper heat bar 14 and lower heat bar 16 are in a fully closed position (generally parallel with the back-up pad bar 12). In step 204, the control system. 100 determines if the pushbutton switch 54 is engaged (or depressed). In step 206, if the upper heat bar 14 and lower heat bar 16 are fully closed, and the pushbutton switch 54 is engaged, the control system 100 sends a heating signal to the wires of the upper heat bar 14 and lower heat bar 16. If the upper heat bar 14 and lower heat bar 16 are not fully closed while the pushbutton switch 54 is engaged (or depressed), or if pushbutton switch 54 is not engaged (or depressed) the control system 100 returns to step 202.

The control system 100 may store information on dwell times and heating temperatures for different film configurations in the film database 114. The control system 100 can adjust the heating signal sent to the wires of the upper heat bar 14 and the lower heat bar 16 based on the dwell time and heating temperature information that correspond to the film being spliced. Prior to sealing the two films, a user may enter information to identify the type of film being spliced via the GUI 112. The control system 100 may search the film database 114 for heating temperatures and dwell times for the different films being spliced. The film database 114 may store the sealing temperatures and dwell times for a plurality of films based on a manufacturer model number, a film composition, a previously stored sealing configuration or any other identification information.

In the preferred embodiment, the pushbutton switch 54 may be disposed directly on the wrapping device 10. However, those skilled in the art will recognize that the pushbutton switch 54 may be located in other places without departing from the scope of the present disclosure, with the object being that the pushbutton switch 54 and the position indication switch 52 be sufficiently distant so as to avoid unintended energizing of the upper heat bar 14 and the lower heat bar 16. The control system 100 may also include hard wired circuits which restrict the electrical flow to the upper heat bar 14 and lower heat bar 16 until the position indicator switch 52 and pushbutton switch 54 are simultaneously engaged.

All patents referred to herein, are hereby incorporated herein by reference, whether or not specifically done so within the text of this disclosure. In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A center-folded film splicer for a wrapping device, comprising:
   a frame;
   a track attached to the frame; and
   a splicer assembly attached to the track, the splicer assembly comprising a synchronized hinge, an upper heat bar coupled to the hinge, a lower heat bar coupled to the hinge, and a backup pad bar attached to the hinge and disposed between the upper heat bar and the lower heat bar,
   wherein the hinge is configured to pivot the upper heat bar and the lower heat bar in unison.

2. The center-folded film splicer of claim 1 wherein the splicer assembly is slidably attached to the track.

3. The center-folded film splicer of claim 2 wherein the splicer assembly is configured to move between an operating position and a storage position.

4. The center-folded film splicer of claim 2, wherein the splicer assembly is slidably attached to the track with a slide roller carriage.

5. The center-folded film splicer of claim 1 wherein the upper heat bar and the lower heat bar simultaneously seal an upper leg of a first center-folded film and an upper leg of second center-folded film on a first side of the back-up pad bar and a lower leg of the first center-folded film and a lower leg of the second center-folded film on a second side of the back-up pad bar.

6. The center-folded film splicer of claim 1 further comprising a film feeder.

7. The center-folded film splicer of claim 1 further comprising a control system configured to control heating of the upper heat bar and the lower heat bar.

8. The center-folded film splicer of claim 7 further comprising a position indication switch on the upper heat bar that is electrically coupled to the control system.

9. The center-folded film splicer of claim 8 further comprising a pushbutton switch electrically coupled to the control system, wherein the control system sends a heating signal to the upper heat bar and the lower heat bar when the position indication switch indicates that the upper heat bar and the lower heat bar are fully closed and the pushbutton switch is engaged.

* * * * *

UNITED STATES PATENT AND TRADEMARK OFFICE
CERTIFICATE OF CORRECTION

| | |
|---|---|
| PATENT NO. | : 9,004,136 B2 |
| APPLICATION NO. | : 13/292727 |
| DATED | : April 14, 2015 |
| INVENTOR(S) | : Dittmer et al. |

It is certified that error appears in the above-identified patent and that said Letters Patent is hereby corrected as shown below:

In the specification

Column 1, line 7, "tiled" to read as --titled--.

Column 7, line 35, "system." to read as --system--.

Signed and Sealed this
Tenth Day of November, 2015

Michelle K. Lee
*Director of the United States Patent and Trademark Office*